[19] United States Patent
Nomura et al.

[11] Patent Number: 5,543,971
[45] Date of Patent: Aug. 6, 1996

[54] BACKLASH REMOVING DEVICE FOR STOWED LENS BARREL

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 354,069

[22] Filed: Dec. 6, 1994

[30] Foreign Application Priority Data

Dec. 6, 1993 [JP] Japan .................................. 5-65078 U

[51] Int. Cl.⁶ .............................. G02B 15/14; G03B 1/18
[52] U.S. Cl. .......................... 359/697; 359/696; 359/694; 359/700; 359/699; 354/195.12
[58] Field of Search ............................. 354/195.12, 400; 359/697, 698, 696, 695, 694, 700

[56] References Cited

U.S. PATENT DOCUMENTS

| | | | |
|---|---|---|---|
| 4,936,664 | 6/1990 | Haraguchi et al. | 359/696 |
| 4,944,030 | 7/1990 | Haraguchi et al. | 354/403 |
| 4,962,399 | 10/1990 | Numako et al. | 354/195.1 |
| 4,967,218 | 10/1990 | Numako et al. | 354/195.1 |
| 5,012,273 | 4/1991 | Nakamura et al. | 354/485 |
| 5,016,032 | 5/1991 | Haraguchi et al. | 354/195.1 |
| 5,077,569 | 12/1991 | Notagashira | 354/195.12 |
| 5,142,315 | 8/1992 | Haraguchi et al. | 354/199 |
| 5,144,493 | 9/1992 | Nomura | 359/700 |
| 5,150,145 | 9/1992 | Haraguchi et al. | 354/403 |
| 5,157,429 | 10/1992 | Haraguchi et al. | 354/149.1 |
| 5,162,831 | 11/1992 | Haraguchi et al. | 354/195.1 |
| 5,196,963 | 3/1993 | Sato | 359/699 |
| 5,214,462 | 5/1993 | Haraguchi et al. | 354/187 |
| 5,264,885 | 5/1993 | Haraguchi et al. | 354/202 |
| 5,276,475 | 1/1994 | Haraguchi et al. | 354/202 |
| 5,280,317 | 1/1994 | Haraguchi et al. | 354/195.1 |
| 5,302,991 | 4/1994 | Nakayama | 354/195.12 |
| B1 4,944,030 | 5/1993 | Haraguchi et al. | 354/403 |

*Primary Examiner*—Georgia Y. Epps
*Assistant Examiner*—Ricky Mack
*Attorney, Agent, or Firm*—Greenblum & Bernstein, P.L.C.

[57] ABSTRACT

A backlash removing device for a lens barrel, including a plurality of lens groups movable in an optical axis direction and cylindrical members movable in the optical axis direction by a motor for moving the plurality of lens groups. A motion converting mechanism having a rotation member for converting rotation of the motor to movement of the plurality of lens groups through the cylindrical members so as to move the plurality of lens groups between an extended position and a stowed position is provided. A lens position detecting mechanism directly detects positions of the rotation member for indirectly detecting positions of the plurality of lens groups and a control mechanism drives the motor to move the lens groups between the extended position and the stowed position. The control mechanism changes a rotational direction of the motor from a forward direction to a reverse direction after the lens position detecting mechanism detects that the rotation member reaches the stowed position of the rotation member when the cylinder members move the lens groups to the stowed position from the extended position, and then stops the motor after a rotational amount of the motor in the reverse direction reaches a predetermined amount.

7 Claims, 10 Drawing Sheets

5,543,971

BACKLASH REMOVING DEVICE FOR STOWED LENS BARREL

BACKGROUND OF THE INVENTION

1. Field of the Invention

The present invention relates to a backlash removing device for a stowed (i.e., stored) lens barrel that is used when the lens barrel is stowed in the camera.

2. Description of the Related Art

In some compact cameras with a zoom lens, when a zoom lens barrel is stowed in the camera body, the rearmost portion of the rearmost lens group retracts to a position where it is almost touching the surface of a film in order to realize (i.e., accomplish) the miniaturization of the camera. In these cameras, the zoom lens barrel is driven by means of gear trains, cam mechanisms, and the like. Due to this structure, when the zoom lens barrel is stowed, it is possible for it to be accidently pushed from the outside towards the camera body. This is possible because of backlash present in the gear trains, the cam mechanisms and the like, which may cause the rearmost lens group to actually touch the photographic film surface, clearly an event which should be avoided. If the lens barrel, placed at its stowed position, further retracts even by a small amount, when pushed from the outside towards the camera body, the user of the camera tends to lose reliance on the camera.

SUMMARY OF THE INVENTION

It is therefore an object of the present invention to eliminate these drawbacks present in conventional cameras and to provide a backlash removing device for a stowed lens barrel used in cameras to prevent the stowed lens barrel from moving back into the photographic film because of backlash in the gear trains, cam mechanism, and the like.

According to one aspect of the present invention, there is provided a backlash removing device for a lens barrel. The backlash removing device includes a plurality of lens groups movable in an optical axis direction and cylindrical members moving in the optical axis direction by a motor for moving the plurality of lens groups. A motion converting mechanism having a rotation member for converting a rotation of the motor to a movement of the plurality of lens groups through the cylindrical members so as to move the plurality of lens groups between an extended position and a stowed position is provided. A lens position detecting mechanism which directly detects positions of the rotation member for indirectly detecting positions of the plurality of lens groups and a control mechanism drives the motor to move the lens groups between the extended position and the stowed position. The control mechanism changes a rotational direction of the motor from a forward direction to a reverse direction after the lens position detecting mechanism detects that the rotation member reaches a stowed position of the rotation member when the cylindrical members move the lens groups to the stowed position from the extended position, and then stops the motor after a rotational amount of the motor in the reverse direction reaches a predetermined amount.

According to another aspect of the present invention, there is provided a backlash removing method for a lens barrel including a plurality of lens groups supported so as to be movable in an optical axis direction, a motion converting mechanism for moving the plurality of lens groups in the optical axis direction between an extended position and a stowed position through a motor. The motion converting mechanism includes a rotation member driven to rotate by the motor and a lens position detecting mechanism which directly detects positions of the rotation member for indirectly detecting positions of the plurality of lens groups. The backlash removing method comprises steps of changing a rotational direction of the motor from a forward direction to a reverse direction after the lens position detecting mechanism detects that the rotation member reaches a stowed position of the rotation member when the cylindrical members move the lens groups to the stowed position from the extended position and stopping the motor after a rotational amount of the motor in the reverse direction reaches a predetermined amount.

The present disclosure relates to subject matter contained in Japanese Utility Model Application No. 5-65078 (filed on Dec. 6, 1993) which is expressly incorporated herein by reference in its entirety.

BRIEF DESCRIPTION OF THE DRAWINGS

The present invention will be more apparent from the following description with reference to the accompanying drawings in which.

DETAILED DESCRIPTION OF PREFERRED EMBODIMENTS

Figure 7:
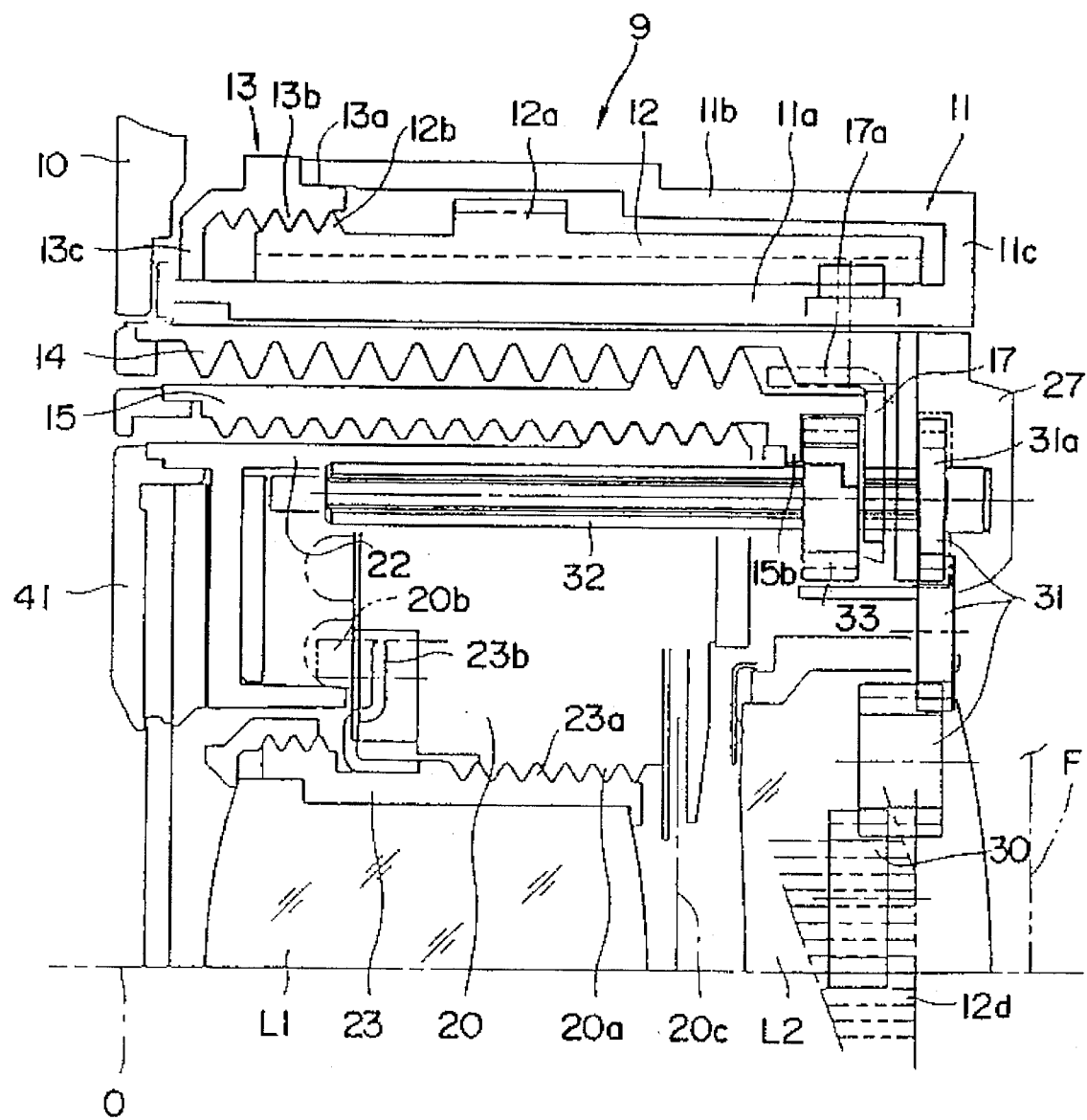
FIG. 7 is a lateral cross-sectional view of the upper half of the accommodated zoom lens barrel block according to the present invention.
Figure 8:
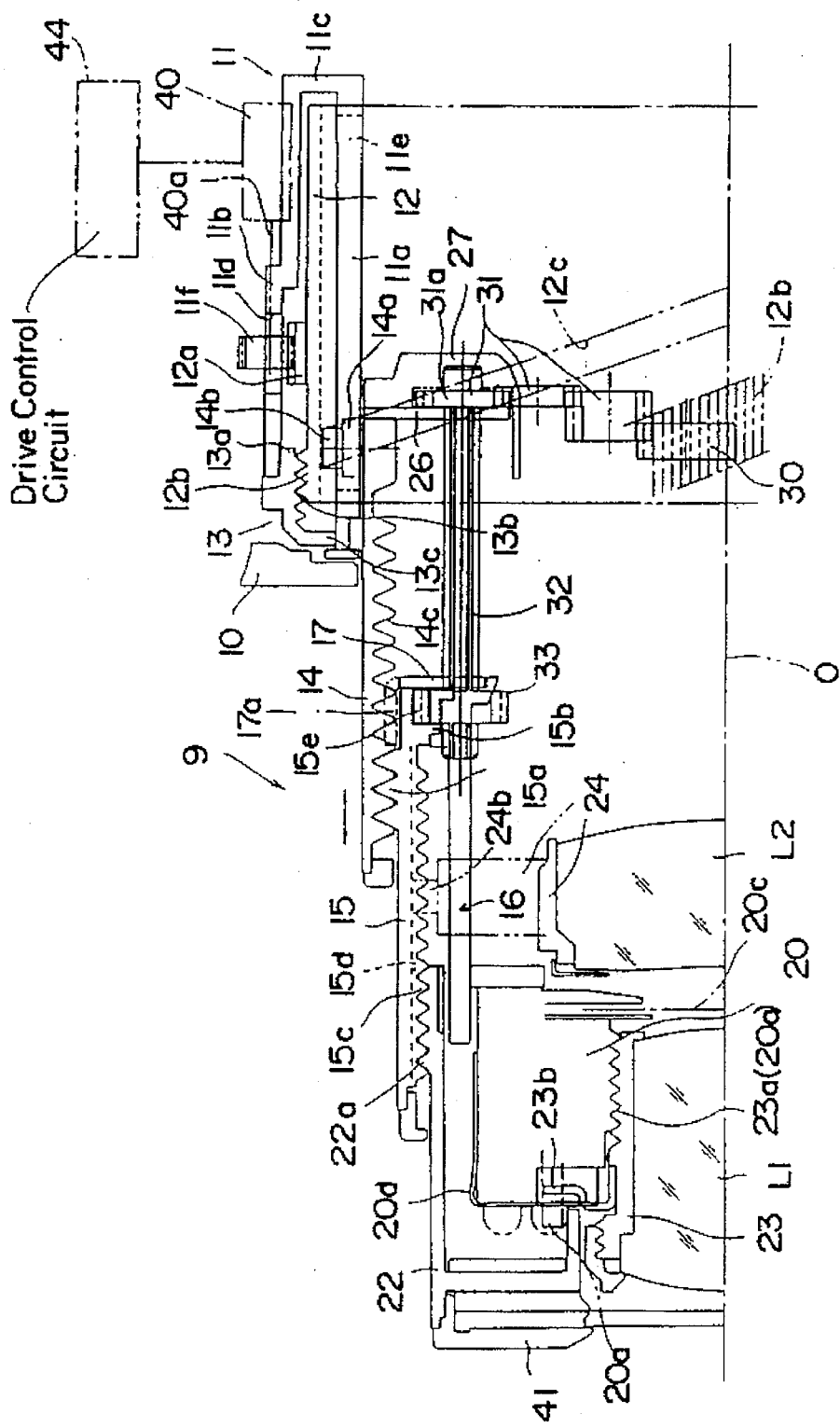
FIG. 8 is a lateral cross-sectional view of the upper half of the extended zoom lens barrel block according to the present invention.

A backlash removing device for a zoom lens barrel according to an embodiment of the present invention will be explained with reference to FIGS. 7 and 8. These show a lens barrel block 9 according to the present invention. The zoom lens barrel block 9 includes a front lens group L1 and a rear lens group L2, and the focusing operation is carried out by the movement of the front lens group L1 as it travels in the direction of the optical axis O of the lens system.

A fixed lens barrel 11 of the zoom lens barrel block 9 is integrally formed with a camera body 10. The fixed lens barrel 11 includes an inner cylinder 11a and an outer cylinder 11b. The inner and outer cylinders 11a and 11b are connected to each other through a connecting wall 11c, and the front ends of the cylinders 11a and 11b are opened. A rotation cylinder (i.e., a cam ring) 12, which is inserted from the open end of the cylinders 11a and 11b, is rotatably mounted on the outer periphery of the inner cylinder 11a. Three straight guide grooves 11e are formed on the inner wall 11a and each extend in a direction parallel to the optical axis O. Only one of the three straight guide grooves 11e is shown in FIG. 8.

Figure 2:
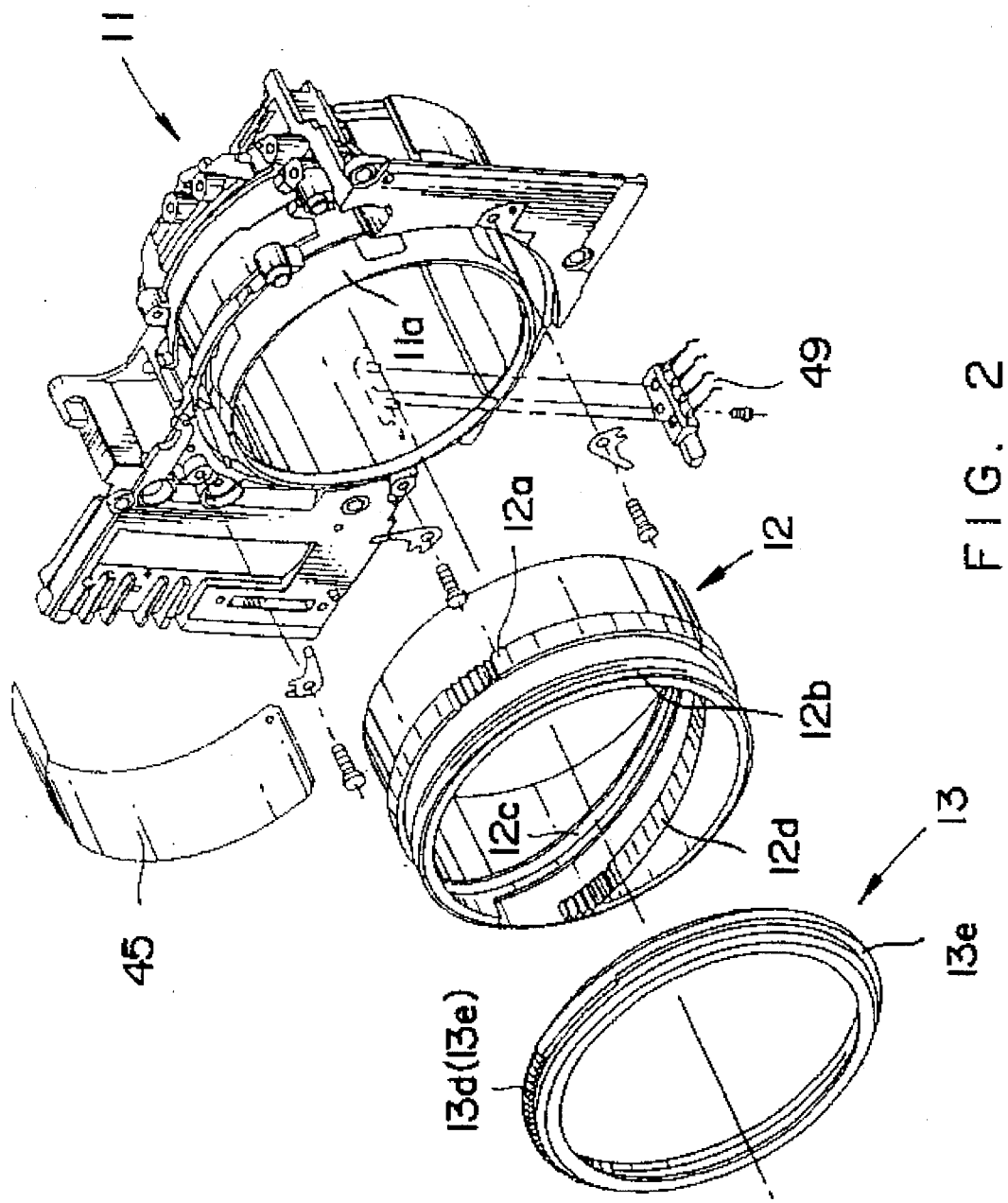
FIG. 2 is an enlarged isometric view of the rear portion of the zoom lens barrel block shown in FIG. 1.

A spur gear 12a is integrally formed with the rotation cylinder 12 on an outer periphery thereof and a fine thread 12b is integrally formed with the cylinder 12 at a tip of the outer peripheral portion thereof. On the inner wall of the rotation cylinder 12 are formed three lead grooves 12c parallel to one another and diagonal to the circumferential direction of the cylinder 12, and a diagonal inner gear 12d parallel to the lead grooves 12c. Only one of the lead grooves 12c is shown in FIGS. 2 and 8.

A support ring 13 is secured to the front end of the inner cylinder 11a and outer cylinder 11b of the fixed lens barrel 11. The support ring 13 includes a portion 13a engaging the inner face of the outer cylinder 11b; a thread portion 13b engaging the fine thread 12b; a portion 13c contacting an outer face of the inner cylinder 11a; and an outer flange 13e. The support ring 13 is biased against the fixed lens barrel 11 by a spring means not shown and is retained at a predetermined position. Reference symbol 13d is a gear formed on an outer periphery of the support ring 13 for a rotating operation. The support ring 13 also functions to eliminate the lack of strength at the opening of the inner cylinder 11a and the outer cylinder 11b.

A motor 40 for driving the zoom lens barrel block 9 is attached to the outer cylinder 11b of the fixed lens barrel 11, and a pinion 11f meshing the spur gear 12a is mounted to the tip of a rotating shaft 40a of the zoom motor 40. Further, a notch 11d for the pinion 11f is formed at a portion opposing the spur gear 12a of the rotation cylinder 12, and other notches similar to the notch 11d are formed on the inner cylinder 11a to expose the lead grooves 12c and the diagonal inner gear 12d.

A first cylinder 14 which moves in the direction of the optical axis O fits in the inner cylinder 11a of the fixed lens barrel 11. Three straight guide projections 14a are integrally formed with the outer periphery of the first cylinder 14 and engage the guide grooves 11e of the fixed lens barrel 11. Only one of the three guide projections 14a is shown in FIG. 8. A pin 14b engaging the corresponding lead groove 12c of the rotation cylinder 12 is formed on each of the guide projections 14a. A female helicoid 14c and three straight guide grooves 14d parallel to the optical axis O are formed on the inner wall of the first cylinder 14. Only one of the three straight guide grooves 14d can be seen in FIG. 3. With the construction described above, the rotation of the rotation cylinder 12 causes the first cylinder 14 to move in the direction of the optical axis O without rotating by means of the guide grooves 11e and the lead grooves 12c.

Inside the first cylinder 14 a second cylinder 15 is accommodated, and at a rear portion of the outer periphery of the second cylinder 15 is formed a male helicoid 15a engaging the female helicoid 14c of the first cylinder 14. A straight guide member 16 is formed in the second cylinder 15, and a straight guide plate 17 is fixed by fastening screws 19 to a rear portion of the guide member 16. An inner flange 15b is integrally formed with the second cylinder 15 between the guide member 16 and the guide plate 17 so as to rotate in relation to the guide member 16 and the guide plate 17 as illustrated in FIGS. 7 and 8. Three straight guide keys 17a are formed on the periphery of the guide plate 17 and engage the guide grooves 14d. As a result, the guide member 16 and the guide plate 17 rotate in relation to the second cylinder 15 and they integrally move in the direction of the optical axis O. In other words, the second cylinder 15 is rotatable and movable in the direction of the optical axis O at the same time by means of the male and female helicoids 15a and 14c. Also the guide member 16 and the guide plate 17 are movable with the second cylinder 15 in the direction of the optical axis O without rotating.

The guide member 16 is provided with three straight keys 16b each extending in a direction parallel to the optical axis O. A guide member 18 for linearly guiding the front lens group L1 is provided with three straight keys 18a each extending in a direction parallel to the optical axis O. The straight keys 16b engage the straight keys 18a. A shutter block 20 is secured to the front lens group guide member 18 through fastening screws 21 and is further secured to the front lens group supporting cylinder 22. As a result, the shutter 20 and the front lens group supporting cylinder 22 are prevented from rotating and are allowed to move in the direction of the optical axis O.

Figure 1:
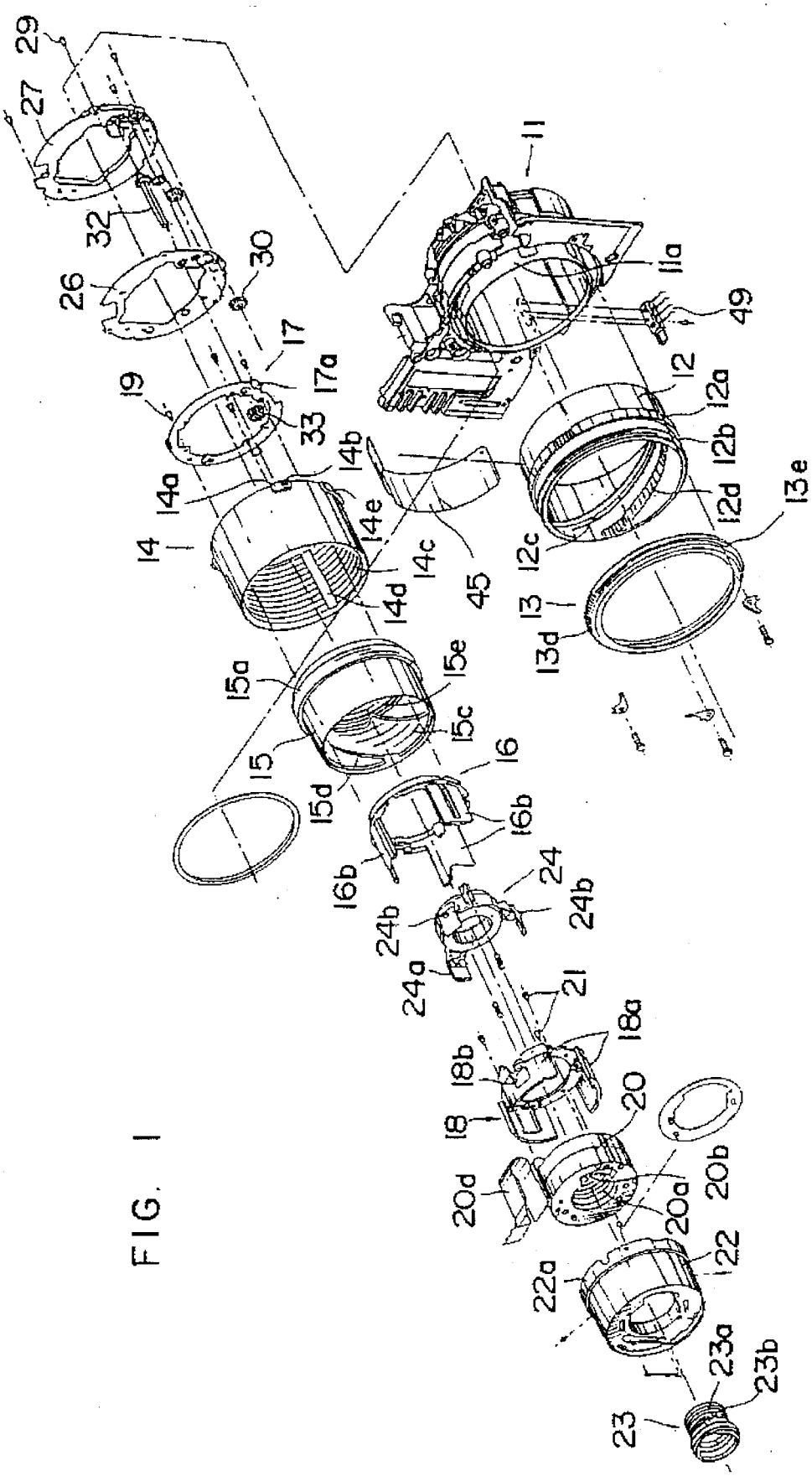
FIG. 1 is an exploded isometric view of a zoom lens barrel block according to an embodiment of the present invention.
Figure 4:
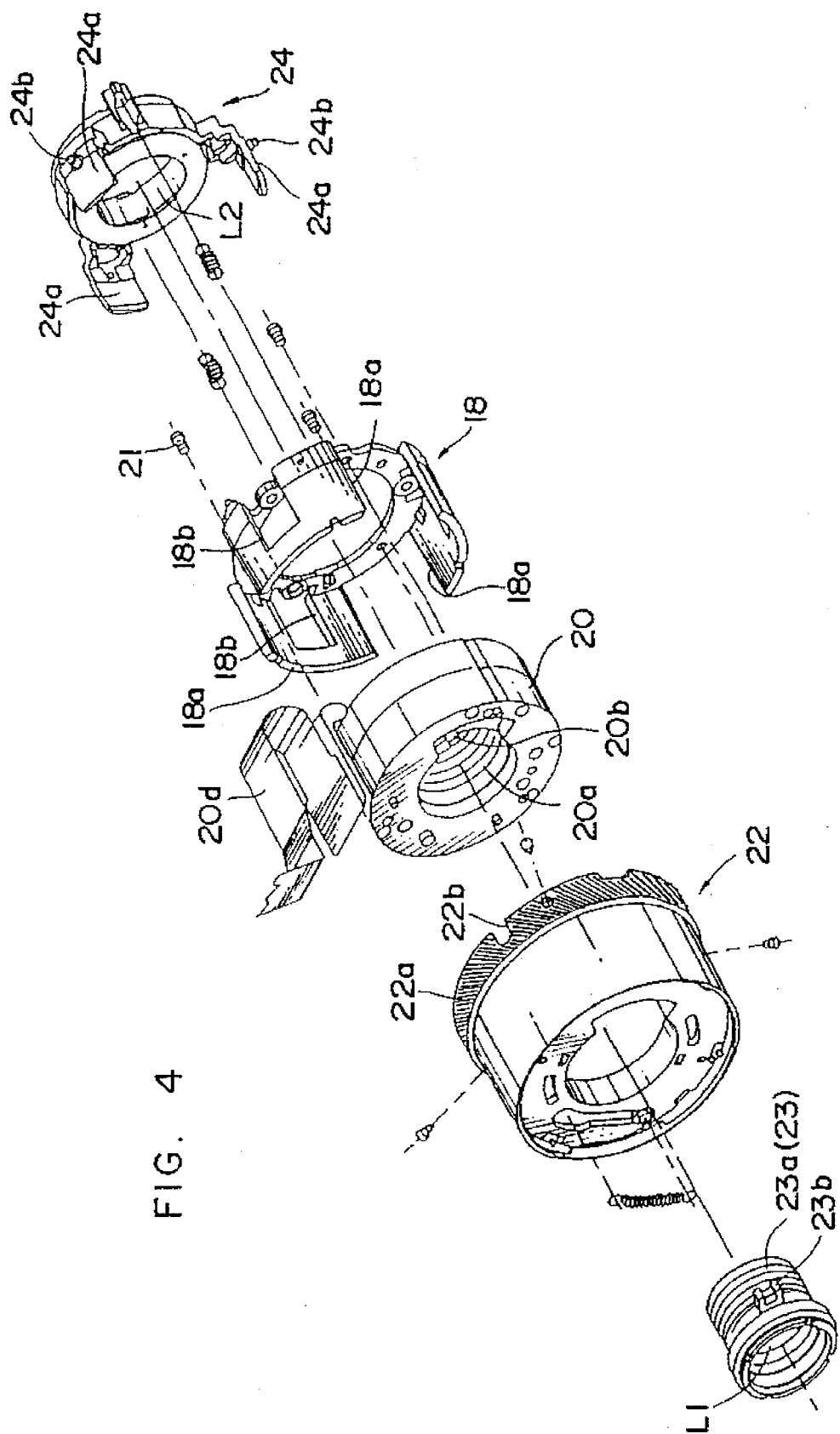
FIG. 4 is an enlarged isometric view of the front portion of the zoom lens barrel block shown in FIG. 1.

As illustrated in FIGS. 1 and 4, the shutter block 20 is provided with a female helicoid 20a at a center portion thereof, and a male helicoid 23a of a front lens frame 23 is engaged with the female helicoid 20a. At the rear portion of the outer periphery of the front lens group supporting cylinder 22, a male helicoid 22a is formed to move the front lens frame 23 during a zooming operation. The shutter block 20 is provided with shutter blades 20c, and driving signals are supplied to the shutter block 20 through a flexible printed circuit board (FPC board) 20d.

A rear lens group guiding slot 18b is formed on each of the straight keys 18a of the front lens group guide member 18 for linearly moving the rear lens group L2 in the direction of the optical axis O. The rear lens group L2 is secured to the rear lens frame 24. Three straight keys 24a engaging the rear lens group guiding slots 18b are formed on the rear lens frame 24. A cam pin 24b is formed on each of the keys 24a so as to project in a radial direction therefrom.

A female helicoid 15c and three cam grooves 15d are formed on the inner periphery of the second cylinder 15. The female helicoid 15c engages a male helicoid 22a of the front lens group supporting cylinder 22, and the cam grooves 15d engage the cam pins 24b of the rear lens frame 24. The cam grooves 15d meet with the female helicoid 15c at the same position in the circumferential direction such that a part of the female helicoid 15c is removed. When assembled, the cam pins 24b of the rear lens frame 24 are engaged with open grooves 22b of the front lens group supporting cylinder 22, and under this condition, the cam pins 24b are engaged with the cam grooves 15d and the male helicoid is engaged with the female helicoid 15c. Under these conditions, the rotation of the second cylinder 15 causes the front lens group supporting cylinder 22 (front lens group L1) to linearly move in the direction of the optical axis O due to the relationships between the female helicoid 15c and the male helicoid 22a and between the keys 16b of the guide member 16 and the keys 18a of the front lens guide member 18. Further, the rotation of the second cylinder 15 causes the rear lens frame 24 (rear lens group L2) to move along a predetermined path in the optical direction O due to the relationships between the cam grooves 15d and the cam pins 24b and between the keys 24a of the rear lens frame 24 and the guide slots 18b of the front lens guide member 18 to thereby effect zooming.

As explained above, when the rotation cylinder 12 is driven by the zoom motor 40, the first cylinder 14 linearly moves in the direction of the optical axis O, and when the second cylinder 15 is rotated in relation to the first cylinder 14, the second cylinder 15 moves in the direction of the optical axis O while rotating. As a result, the front lens group L1 and the rear lens group L2 linearly move while the distance between the two lens groups changes to provide the zooming operation.

Figure 3:
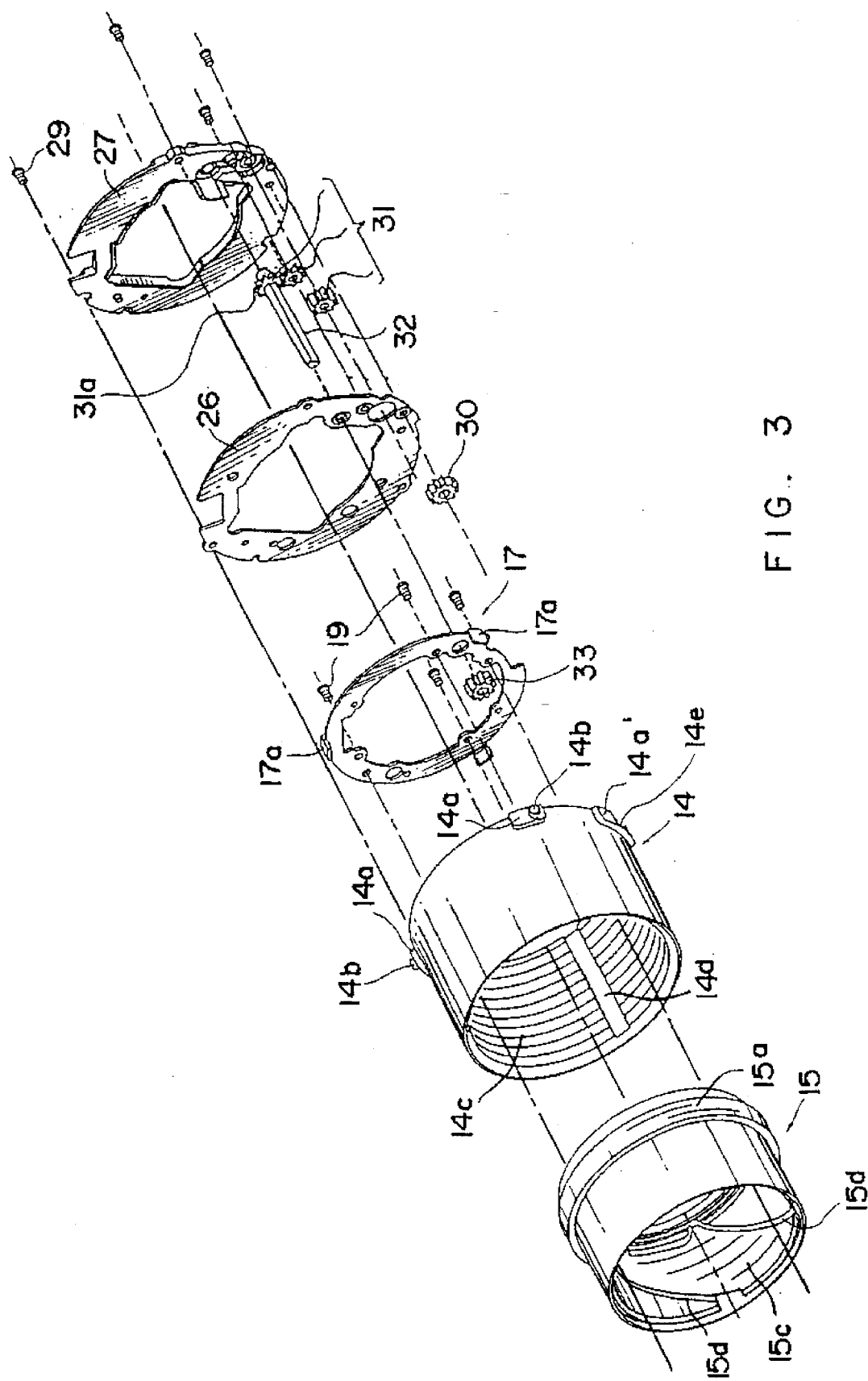
FIG. 3 is an enlarged isometric view of the intermediate portion of the zoom lens barrel block shown in FIG. 1.
Figure 5:
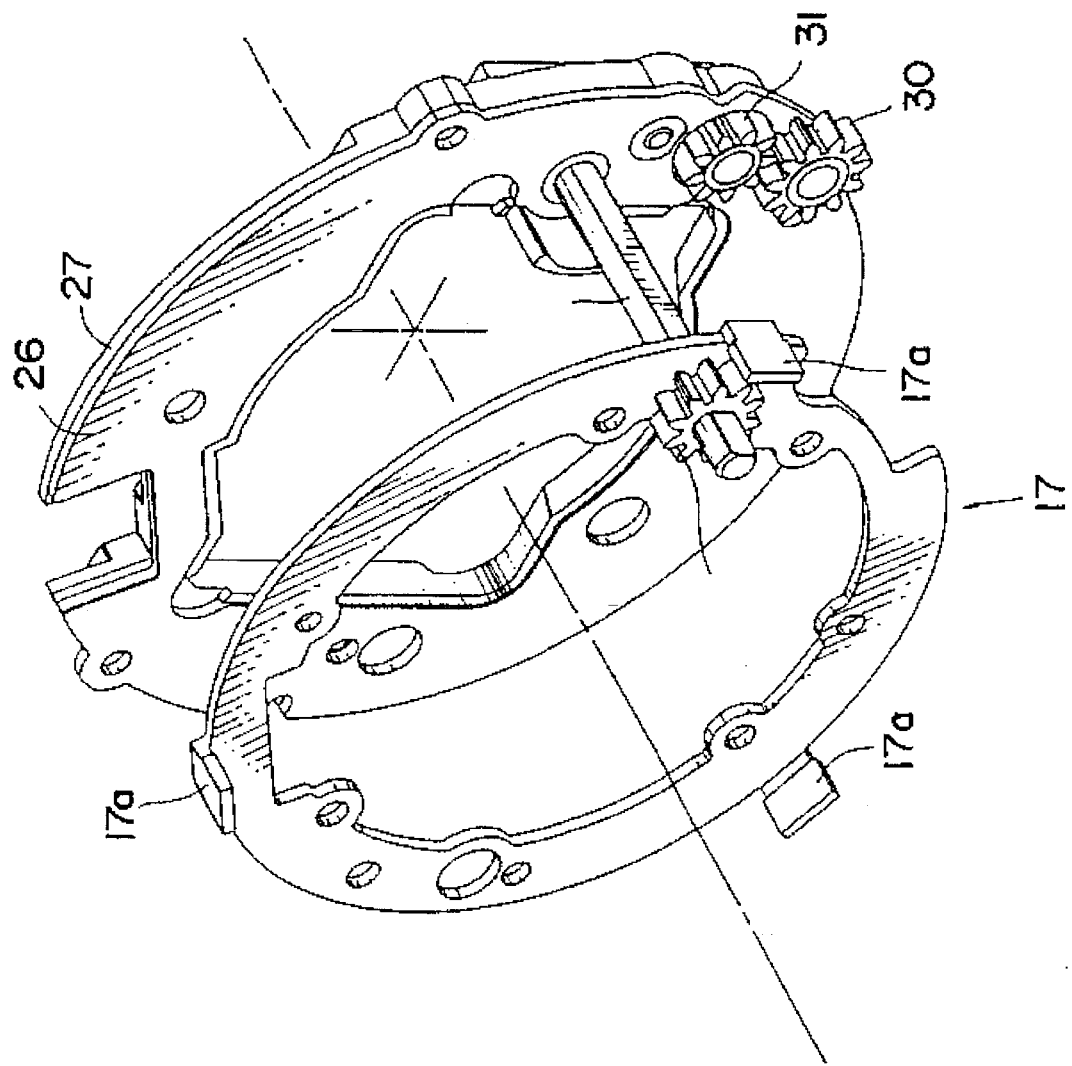
FIG. 5 is an isometric view of a supporting mechanism for a driving system of the zoom lens barrel block.
Figure 6:
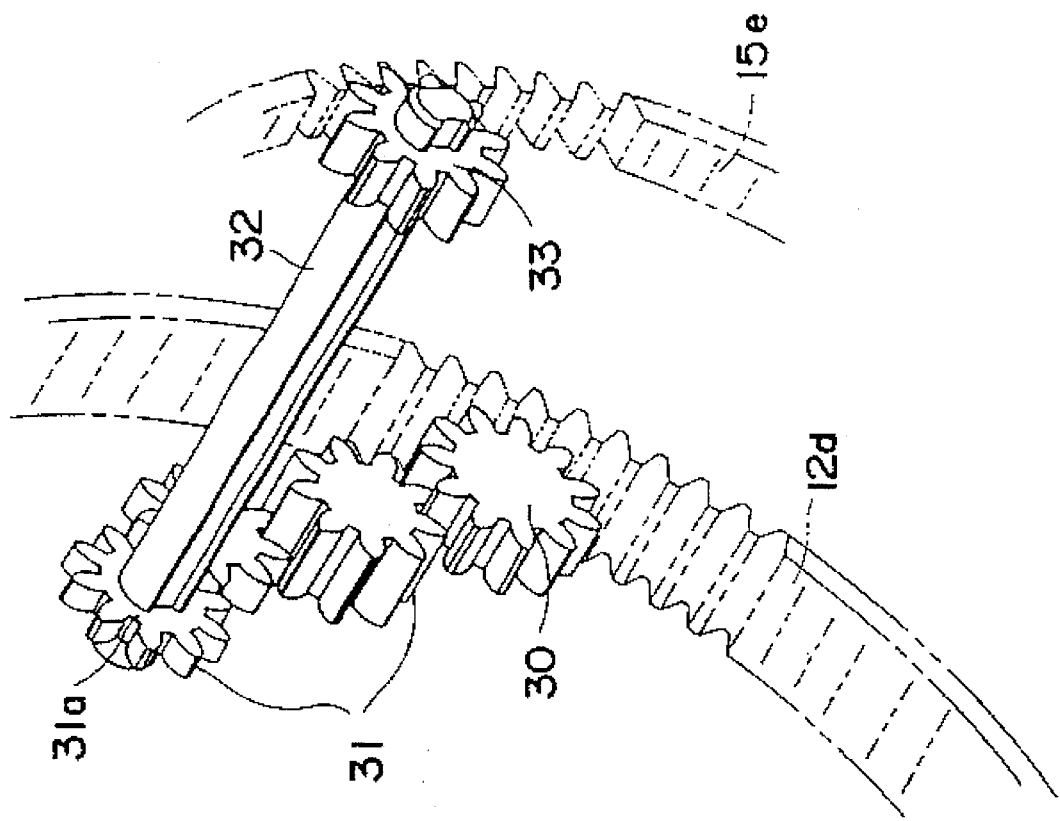
FIG. 6 is an isometric view of gears of the driving system shown in FIG. 5.

Next, a driving mechanism for the second cylinder 15 will be explained. The driving mechanism transmits the rotation of the rotation cylinder 12 to the second cylinder 15. As illustrated in FIG. 3, the rear end of the first cylinder 14 is fixed to a pair of gear supporting plates 26 and 27 through fastening screws 29. A pinion 30 engaging the diagonal inner gear 12d of the rotation cylinder 12 is rotatably attached to the gear supporting plate 26 as shown in FIGS. 5 and 6. Between two straight keys 14a formed on the rear end portion of the first cylinder 14 in the circumferential direction a straight guide projection 14a' having a space 14e is formed for accommodating a pinion 30. A part of the teeth of the pinion 30 accommodated in the space 14e projects from the outer periphery of the first cylinder 14. The diagonal inner gear 12d of the rotation cylinder 12 is parallel to the lead groove 12c as indicated in FIG. 2, so that the engagement between the pinion 30 and the diagonal inner gear 12d is maintained even when the first cylinder 14 moves in the direction of the optical axis O due to the rotation of the rotation cylinder 12. A gear train 31 including the pinion 31a receiving the rotation of the pinion 30 is supported between the gear supporting plates 26 and 27, and a rotation transmitting shaft 32 which extends forwardly along the optical axis O is integrally formed with the with the final gear 31a. The shaft 32 has a uniform cross section which is not round.

A pinion 33 is supported on the guide plate 17 fixed to the rear end surface of the guide member 16. The pinion 33 fits on the shaft 32 such that the pinion 33 is slidable on the shaft 32 in the axial direction thereof but does not rotate with respect to the shaft 32. In other words, the pinion is movable with respect to the shaft 32 in the axial direction thereof and rotatable together with the shaft 32. Thus, the pinion 33 moves along the shaft 32 together with the guide plate 17 (and the second cylinder 15) when the second cylinder 15 moves in the direction of the optical axis O. The pinion 33 meshes with a circumferential inner gear 15e which is formed on the inner surface of the second cylinder 15. Therefore, the rotation of the rotation cylinder 12 is transmitted to the second cylinder 15 through the diagonal inner gear 12d, the pinion 30, the gear train 31, the rotation transmitting shaft 32, the pinion 33 and the circumferential inner gear 15e, regardless of the position of the first cylinder 14 in the direction of the optical axis O.

In the zoom lens barrel 9, with the above construction according to the present invention, when the rotation cylinder 12 is rotated in a forward or reverse direction by the zoom motor 40, the first cylinder 14 moves in the direction of the optical axis O and the second cylinder 15 rotates. The rotation of the second cylinder 15 allows the second cylinder 15 to move in the direction of the optical axis O, and the front lens group L1 and the rear lens group L2 to linearly move while changing the distance between the two to thereby effect zooming. As described above, the front lens group L1 and the rear lens group L2 are movable between the stowed position of the zoom lens barrel 9 shown in FIG. 7 and the fully extended telephoto position in FIG. 8. Moreover, in the stowed position, the first cylinder 14, the second cylinder 15 and the front lens group supporting cylinder 22 do not project from the outer periphery of the main body (camera body 10), resulting in a compact design. Reference numeral 41 in FIGS. 7 and 8 shows a decorative plate.

As described above, a driving force of the zoom motor 40 is transmitted to the first cylinder 14, the second cylinder 15 and the front lens group supporting cylinder 22 through the cam mechanism including the guide grooves 11e, the lead grooves 12c and the pins 14b, the gears and pinions including the diagonal inner gear 12d, the pinion 30, the gear train 31, the pinion 33 and the circumferential inner gear 15e, the shaft 32, the engagement between the female helicoid 14c and the male helicoid 15a, and the engagement between the female helicoid 15c and the male helicoid 22a. Thereby, the zoom lens barrel 9 moves forward and rearward in the direction of the optical axis O. With this arrangement, the zoom lens barrel 9 may slightly move rearward in the direction of the optical axis O by the amount of backlash due to the backlash present in such motion converting mechanisms as the gear train, the cam mechanism and helicoids for converting the rotation of the zoom motor 40 into the linear movement of the zoom lens barrel 9 in the direction of the optical axis O to drive the zoom lens barrel 9. The backlash is an inherent consequence of using such a drive system.

The backlash removing device according to the present invention eliminates the above drawbacks. The detail of the construction thereof will be explained with reference to FIGS. 7, 8 and 9.

Figure 9:
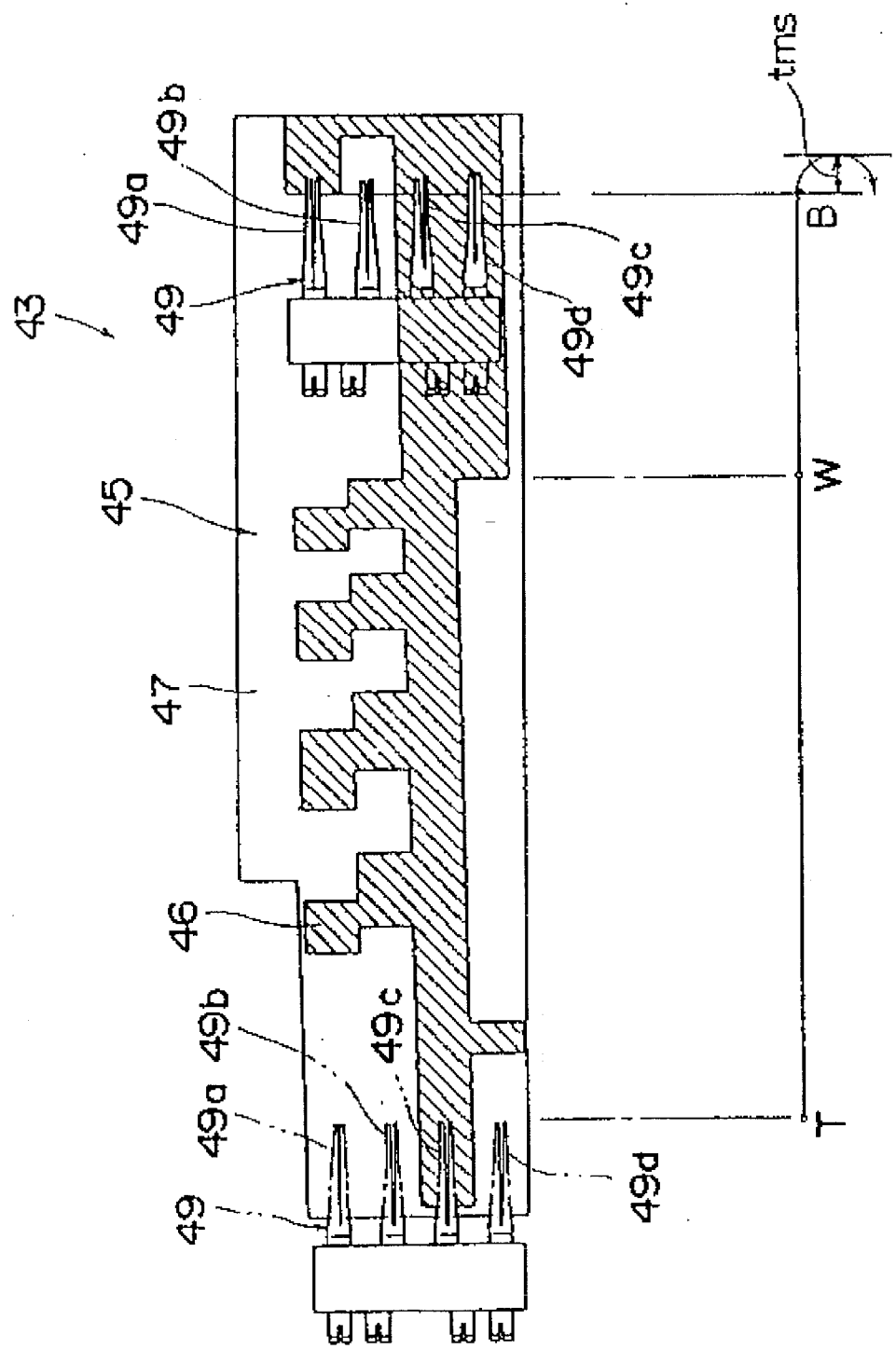
FIG. 9 is a plan view of a position detector for detecting the position of the zoom lens barrel block according to the present invention; and, FIGS. 10(A)–10(F) show schematic views of a zoom motor, a motor gear block, a lens barrel extension mechanism, and a lens unit in different conditions, showing the operation of a backlash removing device for a stowed lens barrel according to the present invention.

A microcomputer (not shown) provided in the camera body 10 includes a drive control circuit 44. The drive control circuit 44 controls the zoom motor 40 in accordance with the signals outputted from a lens position detector 43. The lens position detector 43 indirectly detects the positions of the front and rear lens groups L1 and L2 in the direction of the optical axis O by directly detecting the rotational position of the rotation cylinder 12 in the circumferential direction thereof so as to detect the current focal length and retracted position of the lens groups L1 and L2. The lens position detector 43 outputs signals to the drive control circuit 44. The lens position detector 43 includes a code sheet 45, and a brush unit 49, including a plurality of brushes 49a, 49b, 49c and 49d. The code sheet 45 is fixed to the outer periphery of the rotation cylinder 12 with the lengthwise direction of the code sheet 45 coincident with the circumferential direction of the rotational cylinder 12. The brush unit 49 is fixed to the fixed barrel 11. The brushes 49a, 49b, 49c and 49d slidably move over the code sheet 45 as illustrated in FIG. 9.

The code sheet 45 includes a conductive region 46 and a non-conductive region 47 for having each brush of the brush unit 49 connect with and disconnect from the conductive region 46. With the above configuration, the lens position detector 43 allows only the brush 49c to connect with the conductive region 46 at a lens barrel telephoto terminal position T corresponding to the telephoto terminal position of a whole lens unit (i.e., first and second lens groups L1 and L2) and sends a signal corresponding to the lens barrel telephoto terminal position T to the drive control circuit 44. At a lens barrel extreme wide position W corresponding to the extreme wide angle position of the whole lens unit, the lens position detector 43 causes the brush 49a to disconnect from the conductive region 46 and the brushes 49b, 49c, and 49d to connect with the conductive region 46, and sends a signal corresponding to the lens barrel extreme wide angle position W to the drive control circuit 44.

Due to the U-shape of the contact brush, which deforms slightly when under pressure contact with the code sheet, both sides of the U-shape provide electrical contact. This allows contact brushes 49b, 49c and 49d to contact the code sheet simultaneously at the wide angle position W, in spite of the contact being an edge contact.

The code sheet 45 includes a lens barrel stowed position (i.e., a reference position for stowing lens barrel) B corresponding to the stowed position of the whole lens unit. At the lens barrel stowed position B, the brushes 49a, 49c, and 49d connect with the conductive region 46 and brush 49b disconnects from the same to send a signal corresponding to the stowed position B to the circuit 44.

According to a conventional camera controlling system, the control would immediately stop the zoom motor 40 when detecting that the rotation cylinder 12 reaches the lens barrel stowed position B. Due to this control, if the zoom lens barrel 9 were pushed from the outside towards the camera body 10 when in the stowed position, the zoom lens barrel 9 would move back towards the film F by backlash, which deteriorates the reliance on the camera. In a worst case, the rear end of the rear lens group L2 might bump against the film F if the zoom lens barrel 9 were pushed from the outside towards the camera body 10 when in the stowed position.

To overcome the above-noted drawbacks, according to the present invention, the control changes the rotational direction of the zoom motor 40 from the forward direction where the whole lens unit retracts in the reverse direction when detecting that the rotation cylinder 12 reaches the lens barrel stowed position B, and the control thereafter stops the zoom motor 40 when the rotational amount of the zoom motor 40 in the reverse direction reaches a predetermined amount. The reverse driving of the zoom motor 40 causes the rotation cylinder 12 rotate in the reverse direction, thereby the above-noted backlash is removed. It is preferable that the rotational amount of the reverse rotation of the rotation cylinder 12 should be set, just for eliminating the above-noted backlash. The rotation amount of the reverse rotation of the rotation cylinder 12 may also be set not only for eliminating the backlash but also for projecting further the whole lens unit forward by a little amount. When the rotation cylinder 12 stops after being rotated in the reverse direction, the zoom lens barrel 9 does not move back towards the film F, even if pushed from the outside towards the camera body 10 when in the stowed position since the backlash has been removed.

In the above-noted embodiment, the control changes the rotational direction of the zoom motor when the rotation cylinder 12 reaches the lens barrel stowed position B so as to remove the above-noted backlash. The same effect for eliminating the above-noted backlash can be obtained by another arrangement. In the another arrangement, the control does not stop the zoom motor 40 when detecting that the rotation cylinder 12 reaches the lens barrel stowed position B but continues to drive the zoom motor 40 for a period of time "tms" (i.e., a predetermined period of time) after detecting that the rotation cylinder 12 reaches the lens barrel stowed position B. Thereafter, the control changes the rotational direction of the zoom motor 40 when the period of time "tms" has elapsed. The whole lens unit can be retracted to a retracted position where the rear end of the rear lens group L2 is almost touching the film F by setting the period of time "tms". The retracted position of the whole lens unit can be set to a position of the whole lens unit where the whole lens unit is positioned at the time immediately before the rotation cylinder 12 starts rotating in the reverse direction. The rotational amount of the zoom motor 40 in the reverse direction (i.e., reverse driving amount "rda") may be detected by counting the amount of rotation of the zoom motor 40 or the number of pulses generated by an encoder (not shown) installed in the motion converting mechanism provided between the zoom motor 40 and the rotation cylinder 12.

The backlash removing device of the present invention is schematically shown in FIG. 10. In FIG. 10, the front and rear lens groups L1 and L2 are shown as a single lens unit, i.e., a lens unit 52 for the purpose of explanation. Also in FIG. 10, the motion converting mechanisms for converting the rotation of the zoom motor 40 into the linear movement of the lens unit 52 present in the zoom lens barrel 9 are generally classified into two categories: the motion converting mechanism present in a motor gear block 50 and the motion converting mechanism in a lens barrel extension mechanism 51. A backlash B1 exists between the motor gear block 50 and the lens barrel extension mechanism 51. A backlash B2 exists between the lens barrel extension mechanism 51 and the lens unit 52. In FIG. 10, the backlash B1 is illustrated as a play between a pin 50P and a bifurcated member 51R for the purpose of explanation. The motor gear block 50 is provided with the above pin 50P moving in a direction parallel to the optical axis of the lens unit 52, and the lens barrel extension mechanism 51 is provided with the above bifurcated member 51R engaging the pin 50P. On the other hand, the backlash B2 is illustrated as a play between a pin 51P and a bifurcated member 52R. The lens barrel extension mechanism 51 is provided with the above pin 51P moving in a direction parallel to the optical axis of the lens unit 52, and the lens unit 52 is provided with the above bifurcated member 52R engaging the pin 51P.

Figure 10A:
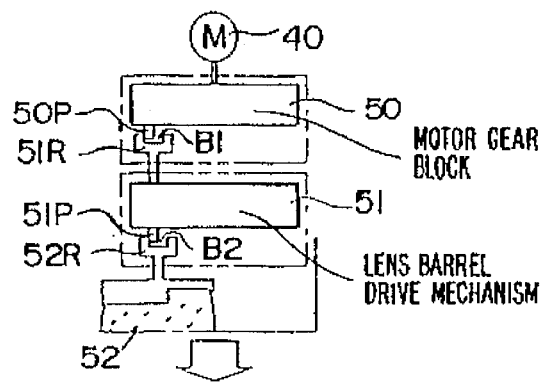
Figure 10B:
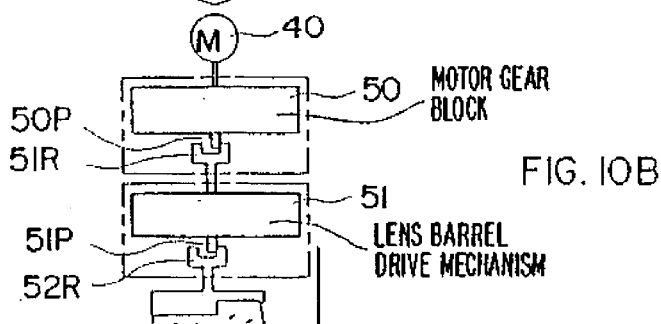
Figure 10C:
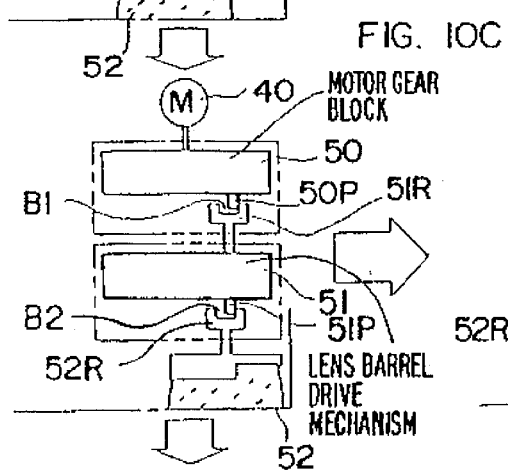
Figure 10F:
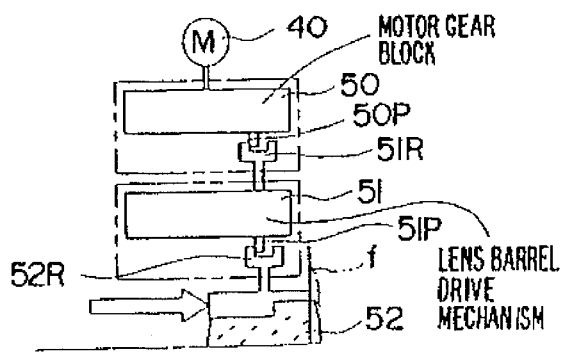

FIG. 10(A) shows the state in which the lens unit 52 is projected and placed at the telephoto extremity. In this state, the backlashes B1 and B2 exist behind the pins 50P and 51P, respectively. Due to these backlashes B1 and B2, the bifurcated members 51R and 52R cannot be moved rearwards (i.e., toward the right side of FIG. 10) but can be moved forwards by the amount of the backlashes B1 and B2, respectively. In this state, when the pin 50P is moved rearwards by the zoom motor 40, the pin 50P first moves rearwards by the amount of the backlash B1 with respect to the bifurcated member 51R, then further moves rearwards together with the bifurcated member 51R, and thereafter the pin 51P starts moving rearwards. Thereafter, the pin 51P moves rearwards by the backlash B2 with respect to the bifurcated member 52R, then further moves rearwards together with the bifurcated member 52R, and thereafter the lens unit 52 reaches the wide angle extremity thereof as shown in FIG. 10(B). When the pin 50P is further moved rearwards by the zoom motor 40, the pin 50P reaches the stowed position (i.e., lens barrel stowed position B) as shown in FIG. 10(C). In this state, the backlashes B1 and B2 exist before the pins 50P and 51P, respectively. Due to these backlashes B1 and B2, if the lens unit 52 is pushed from the outside towards the camera body 10 in the state of FIG. 10(C), the lens unit 52 will move rearwards by the total amount of the backlashes B1 and B2, and accordingly bump against the film F as shown in FIG. 10(F).

Figure 10D:
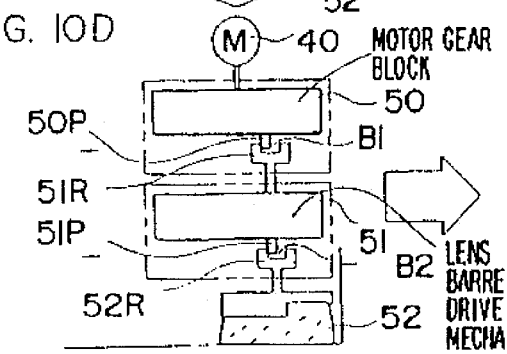
Figure 10E:
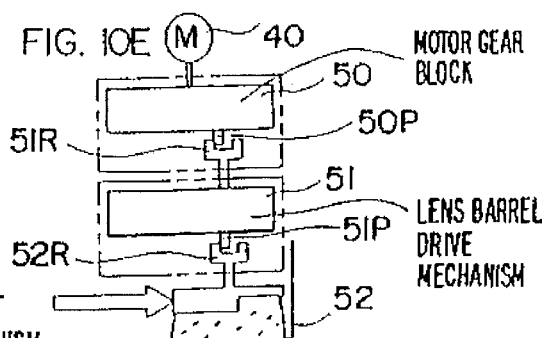

To overcome the above drawbacks, according to the present invention, the drive control circuit 44 changes the rotational direction of the zoom motor 40 to move the pin 50P forwards by the total amount of the backlashes B1 and B2 so as to have the backlashes B1 and B2 occur behind the pins 50P and 51P, respectively, as shown in FIG. 10(D). In the state of FIG. 10(D), even if the lens unit 52 is pushed from the outside towards the camera body 10, the lens unit 52 will not move rearwards as shown in FIG. 10(E).

As noted above, the lens position detector 43 may be provided with an increment system for counting the number of pulses from a reference position. With this increment system, the above-noted predetermined period of time "tms" and reverse driving amount "rda" can be precisely controlled by counting the number of pulses. In this case, for instance, a rotation member provided in the motion converting mechanism may be provided with a pulse encoder which generates pulses, and the period of time "tms" and reverse driving amount "rda" are controlled by counting the number of the pulses generated by the pulse encoder from a reference position. The wide angle extremity of the rotation member may be used as the reference position.

As can be seen from the foregoing, according to the present invention, even if the lens unit is pushed from the outside towards the camera body in the state where the lens unit is located at its stowed position, the lens unit will not retreat, which prevents the reliance on the camera from being deteriorated and also prevents the lens unit from touching the photographic film surface.

We claim:

1. A backlash removing device for a lens barrel, comprising:

a plurality of lens groups movable in an optical axis direction;

cylindrical members movable in said optical axis direction by a motor for moving said plurality of lens groups;

motion converting means having a rotation member for converting a rotation of said motor to a movement of said plurality of lens groups through said cylindrical members so as to move said plurality of lens groups between an extended position and a stowed position;

lens position detecting means which directly detects positions of said rotation member for indirectly detecting positions of said plurality of lens groups; and control means for driving said motor to move said lens groups between said extended position and said stowed position, wherein said control means changes a rotational direction of said motor from a forward direction to a reverse direction after said lens position detecting means detects that said rotation member reaches said stowed position of said rotation member when said cylindrical members move said lens groups to said stowed position from said extended position, and then stops said motor after a rotational amount of said motor in said reverse direction reaches a predetermined amount.

2. The backlash removing device of claim 1, wherein said motion converting means comprises a gear train, helicoids, and a cam mechanism.

3. The backlash removing device of claim 1, wherein said lens position detecting means includes a code sheet fixed to said rotation member and a plurality of brushes slidably movable with respect to said code sheet.

4. The backlash removing device of claim 3, wherein said code sheet has a land portion at a position corresponding to said stowed position of said rotation member.

5. The backlash removing device of claim 1, wherein said control means continues to drive said motor in said forward direction by a second predetermined amount after said lens position detecting means detects that said rotation member reaches said stowed position so as to place said lens groups at said stowed position, then changes said rotational direction of said motor to said reverse direction, and then stops said motor after said rotational amount of said motor in said reverse direction reaches said predetermined amount.

6. The backlash removing device of claim 1, wherein said control means changes said rotational direction of said motor to said reverse direction when said lens position detecting means detects that said rotation member reaches said stowed position, then drives said motor in said reverse direction by said predetermined amount, and then stops said motor with said lens groups being placed at said stowed position.

7. A backlash removing method for a lens barrel including a plurality of lens groups supported so as to be movable in an optical axis direction, motion converting means for moving said plurality of lens groups in said optical axis direction between an extended position and a stowed position by a motor, said motion converting means including a rotation member driven to rotate by said motor, and lens position detecting means which directly detects positions of said rotation member for indirectly detecting positions of said plurality of lens groups, wherein said backlash removing method comprises steps of:

changing a rotational direction of said motor from a forward direction to a reverse direction after said lens position detecting means detects that said rotation member reaches said stowed position of said rotation member when said motion converting means moves said lens groups to said stowed position from said extended position; and stopping said motor after a rotational amount of said motor in said reverse direction reaches a predetermined amount.

* * * * *